United States Patent Office 2,719,695
Patented Oct. 4, 1955

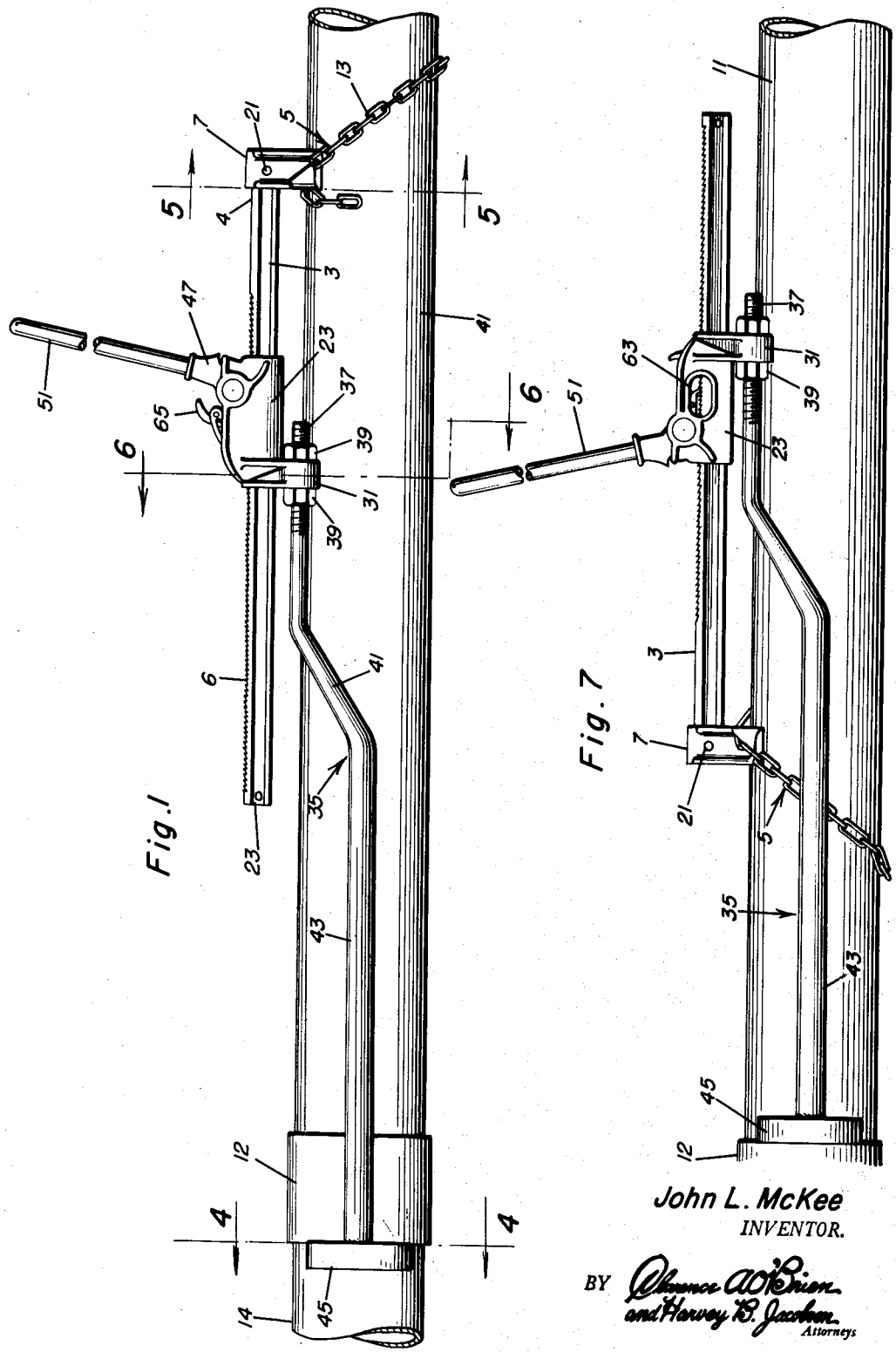

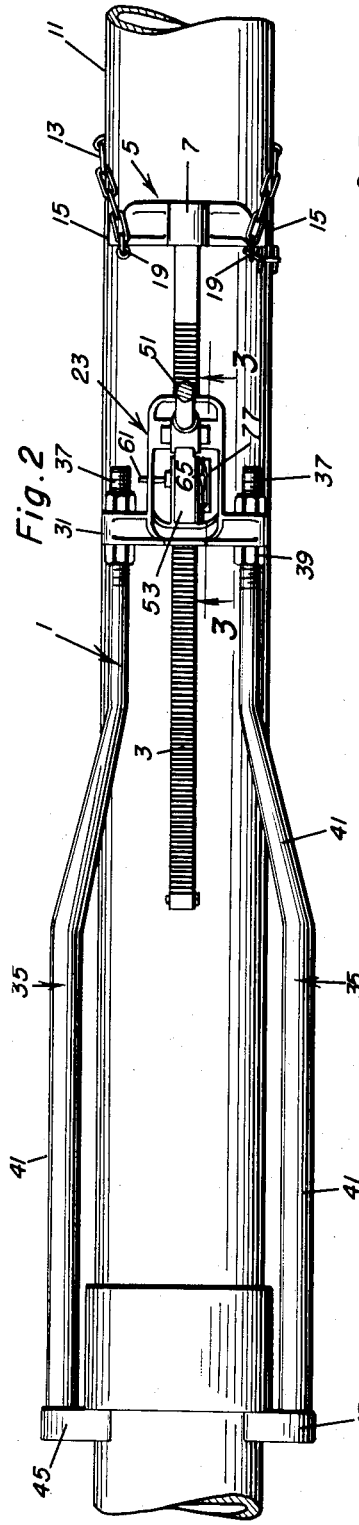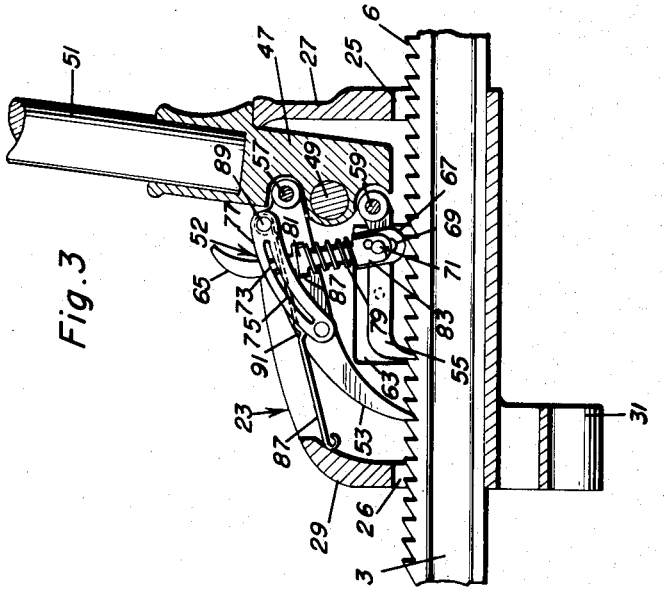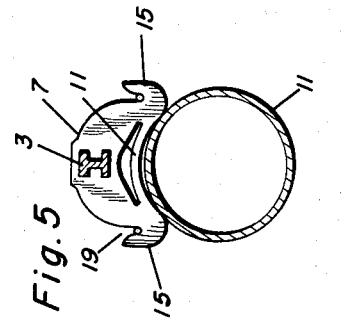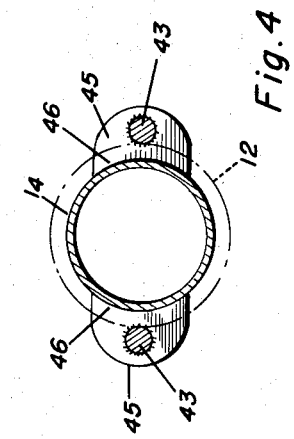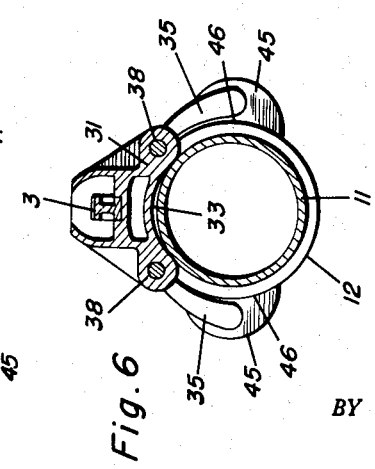
John L. McKee
INVENTOR.

2,719,695

PULLING AND PUSHING APPARATUS FOR COUPLING AND UNCOUPLING PIPE SECTIONS

John L. McKee, Seguin, Tex.

Application August 17, 1953, Serial No. 374,734

2 Claims. (Cl. 254—29)

My invention relates to improvements in pushing and pulling apparatuses for coupling and uncoupling sections of pipe provided at one end with an enlarged sleeve hub for fitting with a slip fit over an end of another section to form a coupling joint.

The primary object of my invention is to provide a labor and time saving, portable, jack-type apparatus attachable to one pipe section to either pull or push the sleeve hub of another pipe section onto or off the pipe section to which the apparatus is attached to thereby couple or uncouple the sections, and which, when attached, will exert pulling or pushing force against the sleeve hub at diametrically opposite sides thereof and of the pipe sections, uniformly, to facilitate maintaining the sections aligned.

Another object is to provide apparatus of the type and for the purpose above specified which is adapted for quick easy attachment to and detachment from a pipe section, and which is easy to operate, safe, substantially fool-proof, and inexpensive to manufacture.

Other and subordinate objects, within the purview of my invention, together with the precise nature of my improvements will become readily apparent when the succeeding description and claims are read with reference to the drawings accompanying and forming part of the specification.

In said drawings:

Figure 1 is a view in side elevation illustrating my improved apparatus, in the preferred embodiment thereof, attached to one pipe section for pulling the sleeve hub of another pipe section onto the pipe section to which the apparatus is attached;

Figure 2 is a view in plan of the same;

Figure 3 is an enlarged view in vertical longitudinal section taken on the line 3—3 of Figure 2;

Figure 4 is a view in vertical transverse section taken on the line 4—4 of Figure 1;

Figure 5 is a view in vertical transverse section taken on the line 5—5 of Figure 1;

Figure 6 is a view in vertical transverse section taken on the line 6—6 of Figure 1; and Figure 7 is a view in side elevation illustrating the apparatus attached to a pipe section for pushing the sleeve hub of another pipe section off the section to which the apparatus is attached.

Referring to the drawings by numerals, the apparatus of my invention comprises a jack designated generally by the numeral 1 and which is of the ratchet bar and alternately acting plural pawl type.

The ratchet bar 3 is provided with attaching means 5 on what constitutes the front end 4 thereof for securing said bar 3 in longitudinally extending position on top of a pipe section 11 and with the ratchet teeth 6 of said bar 3 uppermost. The attaching means 5 comprises a transverse saddle member 7 on said front end 4 with a concave bottom 9 adapted to straddle the top of the pipe section 11, and a shackle chain 13 adapted to be passed under the pipe section 11 and attachable to upwardly opening side hooks 15 on said member 7 to anchor said member in place. The end hooks 15 are provided with narrowed grooves 17 in which links, as at 19, of the shackle chain 13 may be inserted downwardly, edgewise, to interlock said chain 13 and hooks 15. The ratchet bar 3 has its front end 4 fixed in the saddle member 7 in the vertical center of said member 7 by a pin 21, and the ratchet teeth 6 of said bar 3 inclined toward the front end 4 of said bar 3.

An elongated, hollow and upwardly opening jack head 23 is slidably mounted on the ratchet bar 3 for movement forwardly thereon step-by-step along the same by bottom openings 25, 26 at its front and rear ends 27, 29 through which said bar 3 slidably extends. A transverse saddle 31 with a concave bottom 33 is formed on one end of the jack head 23 to extend upon opposite sides of said head and straddle the top of the pipe section 11 to slide along said section and support the jack head 23 above said section 11 so that the ratchet bar 3 is maintained parallel with said pipe section 11.

The jack head 23 is provided with means for pushing or pulling a sleeve hub 12 of another pipe section 14 onto or off the section 11 when the jack head 23 is moved forwardly along the ratchet bar 3, and which will now be described.

A pair of presser rods 35 are detachably attached at corresponding ends 32 thereof in openings 38 in the saddle 31 to extend longitudinally along opposite sides of the ratchet bar 3. Nuts 39 on said ends 37 detachably attach said rods 35 to the saddle 31. The presser rods 35 are provided with downwardly inclined intermediate portions 41 whereby the major portions 43 of said rods are downwardly offset relative to the jack head 23 to dispose the same at diametrically opposite sides of the sleeve hub 12 and pipe sections 11, 14, and said major portions 43 are provided with a pair of terminal presser cross-plates 45 having confronting curved edges 46 for conformably fitting against opposite sides of the pipe section 14, or 11, behind or in front of the sleeve hub 12 according to whether the sleeve hub 12 is to be pulled or pushed.

The jack head 23 is provided with means for moving the same step-by-step along the ratchet bar 3 forwardly of said bar comprising a socket member 47 extending upwardly out of the jack head 23 and rockable longitudinally of said head on a transverse pivot 49 in said head 23 adjacent the front end 27 of said head. A handlebar 51 extends upwardly out of the socket member 47 for rocking the same. A pair of upper and lower, relatively long and short pawls 53, 55 in the jack head 23 are pivoted in vertically spaced relation at corresponding ends thereof, as at 57, 59, to gravitate into engagement with the teeth 6 of the ratchet bar 3. The pivots 57, 59 are arranged above and below the pivot 49 so that said pawls 53, 55 will alternately move the jack head 23 step-by-step upon rocking of the socket 47 by the handle 51 in opposite directions respectively.

A lateral pin 61 on the lower pawl 55 extends out of a side opening 63 in the jack head 23 for manually swinging said pawl upwardly to release the same from the teeth 6.

Means 52 is provided for yieldingly connecting the pawls 53, 55 for independent ratcheting movement and whereby release of the lower pawl 55 will similarly release the upper pawl 53. This means 52 comprises a hand lever 65 extending upwardly out of the jack head 23 and having a lower enlarged end 67 provided with a slot 69 through which a lateral stud 71 on the lower pawl 55 extends.

The lever 65 is rockable on the stud 71 from an ineffective position, shown in the drawings, into an effective position, and is vertically slidable endwise on the stud 71. In the ineffective position of said lever 65, a lateral pin 73 thereon is positioned in one end of an arcuate slot 75 eccentric to the axis of the stud 71 and provided in an arcuate bar 77 fixed on the upper pawl 53 alongside the same, and said lever 65 is lifted so that the stud 71 may play upwardly in the slot 69. When the lever 65 is rocked to effective position, the slot 75 cams the pin 73 downwardly, and also the lever 65, so that when the lower pawl 55 is swung upwardly to release the same, the stud 71 will move the lever 65 upwardly endwise and the pin 73 will coact with the bar 77 to move the upper pawl 53 upwardly and release the same.

A hold-down bar 79 for the lower pawl 55 with enlarged upper and lower ends 81, 83 extends along side the lever 65 and has its lower end 83 pivoted on the stud 71. A coil spring 85 surrounds the hold-down bar 79 and lever 65 and is confined between the upper and lower ends 81, 83 of said bar 79, said spring exerting pressure against the enlarged lower end 83, and an enlargement 87 on the lever 65 to yieldingly hold down the lower pawl 55. A wire spring 87 having one end fixed to a stud 89 on the upper pawl 53 and provided with a notch 91 formed therein underlies the pin 73 and coacts therewith with a snap action to yieldingly latch the lever 65 in ineffective position.

Referring now to the operation of the apparatus, when it is desired to pull the sleeve hub 12 of the pipe section 14 onto the adjacent end of the pipe section 11, the ratchet bar 3 is attached on top of the section 11 in longitudinally extending position by the attaching means 5 with its front end 4 remote from said sleeve 12 so that the jack head 23 will move forwardly along the ratchet bar 3 away from said sleeve 12 under operation of the pawls 53, 55, and the presser plates 45 are engaged behind said sleeve 12, all as shown in Figures 1 and 2. Now, the lever 65 being in ineffective position, as shown in the drawings, by rocking the hand lever 51, the jack head 23 will be moved forwardly along the ratchet bar 3 to exert pull on the presser rods 35 and presser plates 45 to pull the hub sleeve 12 onto the pipe section 11, after which the pawls 53, 55 may be released by lifting the pin 61 and the jack head 23 slid back to release said plates 45 from the hub sleeve 12.

If it is desired to push the hub sleeve 12 off the pipe section 11 to uncouple the pipe sections 11, 14, the ratchet bar 3 is attached on the pipe section 11 by the described attaching means 5 but reversed end for end, so that the jack head 23 will now move forwardly of said bar 3 but toward the hub sleeve 12, and the presser rods 35 are reversed end for end in the saddle 31 and the presser plates 45 are engaged with the front edge of said sleeve 12, all as shown in Figure 7. Now, rocking of the hand lever 51 will cause the jack head 23 to move forwardly along the ratchet bar 3 toward the hub sleeve 12 so that the presser rods 35 and the presser plates 45 will push the sleeve hub 12 off the pipe section 11 to uncouple said pipe sections 11, 14.

The foregoing will, it is believed, suffice to impart a clear understanding of my invention, without further explanation.

What I claim as new is:

1. Apparatus for moving a sleeve hub in opposite directions on one end of a pipe section comprising a ratchet feed jack including a ratchet bar, means on one end of said ratchet bar attachable to the pipe section for attaching said bar in longitudinally extending position on said pipe section, a jack head feedable along said ratchet bar in one direction, a supporting saddle on said head adapted to slidably straddle said pipe section and be fed along the same by said head, a pair of opposite rods paralleling said ratchet bar on opposite sides thereof, means for attaching one end of said rods to said saddle to extend from opposite sides of said saddle selectively so that said saddle will pull said rods or push the same in the direction of feed of said head, and opposite terminal members on the other ends of said rods engageable with opposite ends of said sleeve so that said rods will pull or push against said sleeve when said rods are being pulled or pushed respectively.

2. Apparatus according to claim 1, said terminal members having confronting edges curved in correspondence with said ends of the sleeve for fitting against said ends.

References Cited in the file of this patent
UNITED STATES PATENTS

| Number | Name | Date |
|---|---|---|
| 577,959 | Humphreys | Mar. 2, 1897 |
| 921,973 | Gillett et al. | May 18, 1909 |
| 1,564,537 | Dellb | Dec. 8, 1925 |
| 1,894,835 | Smith et al. | Jan. 17, 1933 |
| 2,502,826 | Cohn | Apr. 4, 1950 |